United States Patent [19]

Wilson et al.

[11] Patent Number: 4,972,432
[45] Date of Patent: Nov. 20, 1990

[54] MULTIPLEXED SYNCHRONOUS/ASYNCHRONOUS DATA BUS

[75] Inventors: Gregory P. Wilson, Lake Zurich; Bryan A. Potratz, Palatine; Thomas J. Walczak, Woodstock; Jeffery L. Mullins, Palatine, all of Ill.

[73] Assignee: Motorola, Inc., Schaumburg, Ill.

[21] Appl. No.: 303,214

[22] Filed: Jan. 27, 1989

[51] Int. Cl.$^5$ .......................... H04B 1/38; H04L 5/16
[52] U.S. Cl. .......................................... 375/7; 375/36; 455/73; 455/88; 455/78; 370/5; 370/84; 370/31
[58] Field of Search ............................ 375/7, 36, 110; 370/85.9, 31, 84, 5; 340/825.06; 379/63; 371/8.2; 455/73, 88, 78

[56] References Cited

U.S. PATENT DOCUMENTS

| | | | |
|---|---|---|---|
| 4,369,516 | 1/1983 | Byrns | 375/110 |
| 4,380,060 | 4/1983 | Wilhelm | 370/5 |
| 4,593,155 | 6/1986 | Hawkins | 455/88 X |
| 4,667,191 | 5/1987 | Comroe et al. | 340/828.5 |
| 4,680,787 | 7/1987 | Marry | 379/63 |
| 4,725,836 | 2/1988 | Guidos | 375/36 X |
| 4,742,560 | 5/1988 | Arai | 455/33 |

OTHER PUBLICATIONS

"Interface Between Data Terminal Equipment and Data Communication Equipment Employing Serial Binary Data Interchange", EIA Standard RS-232-C, Revision of RS-232-B, Aug. 1969, (Reaffirmed Jun., 1981).
R. E. Fisher, "A Subscriber Set for the Equipment Test", The Bell System Technical Journal, Jan., 1979, pp. 123-143.
HMOS Single Chip Microcomputer Data Book, No. ADI 1207R1, 1987, pp. 5-1 through 5-5.
Motorola Semiconductor Technical Data, "8-Bit HMOS Microcomputer", MC68HC811D4, No. BR296, 1986, pp. 1-10.

Primary Examiner—Benedict V. Safourek
Assistant Examiner—Tesfaldet Bocure
Attorney, Agent, or Firm—Raymond A. Jenski; Rolland R. Hackbart

[57] ABSTRACT

A multiplexed synchronous/asynchronous data bus is disclosed in which three bus lines are used to convey bidirectional synchronous data between at least two data devices at a relatively low data rate. Half duplex asynchronous data is applied at a higher data transfer rate to one of the three bus lines when another of the bus lines is held in a logic high state.

29 Claims, 5 Drawing Sheets

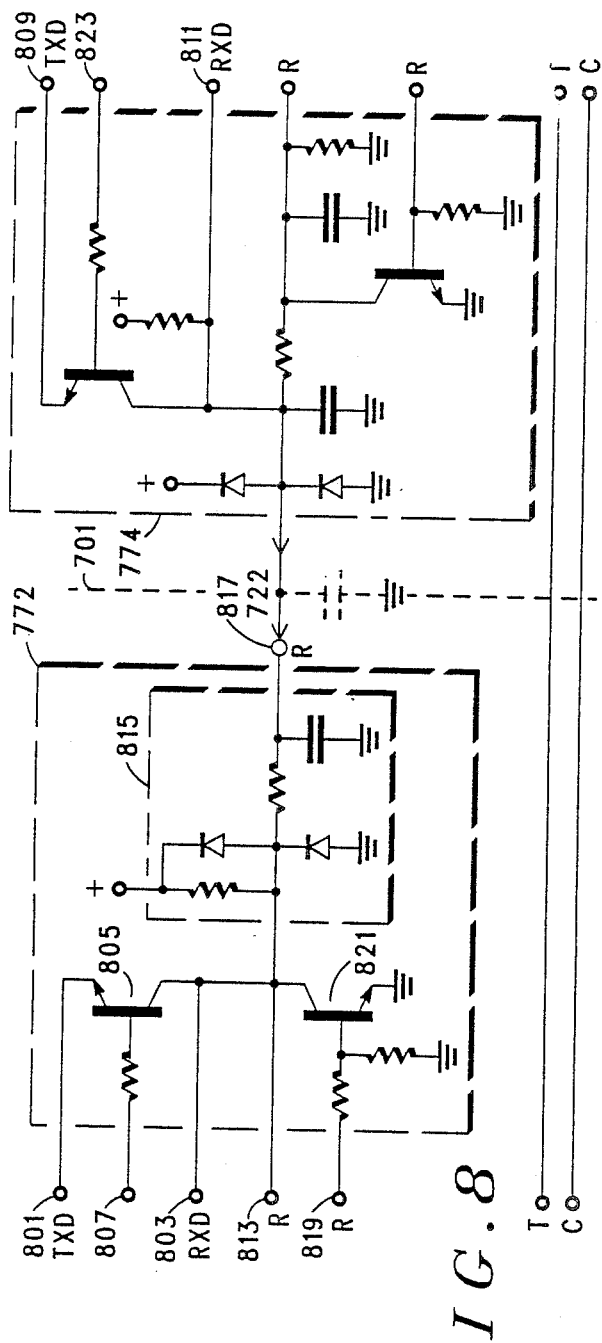
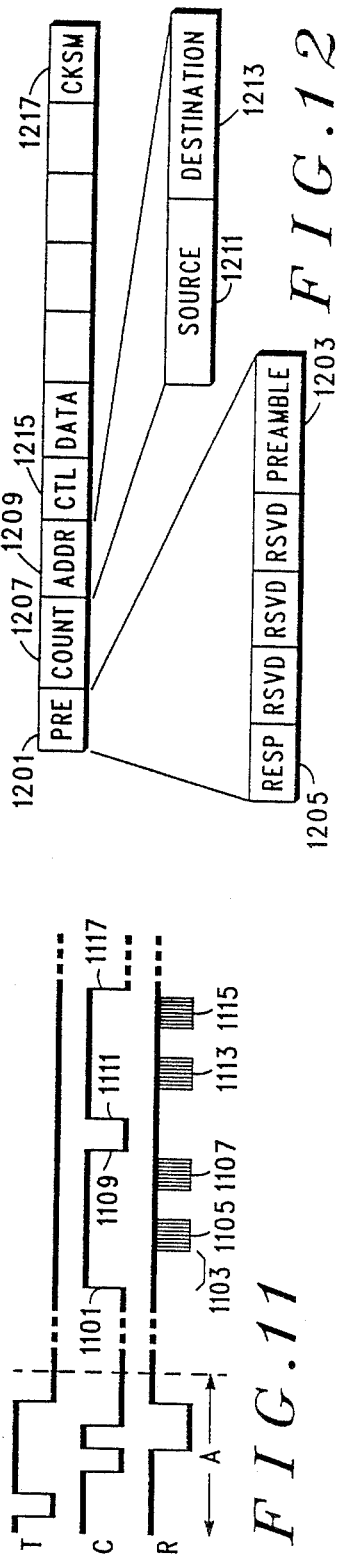
FIG. 8
FIG. 11
FIG. 12

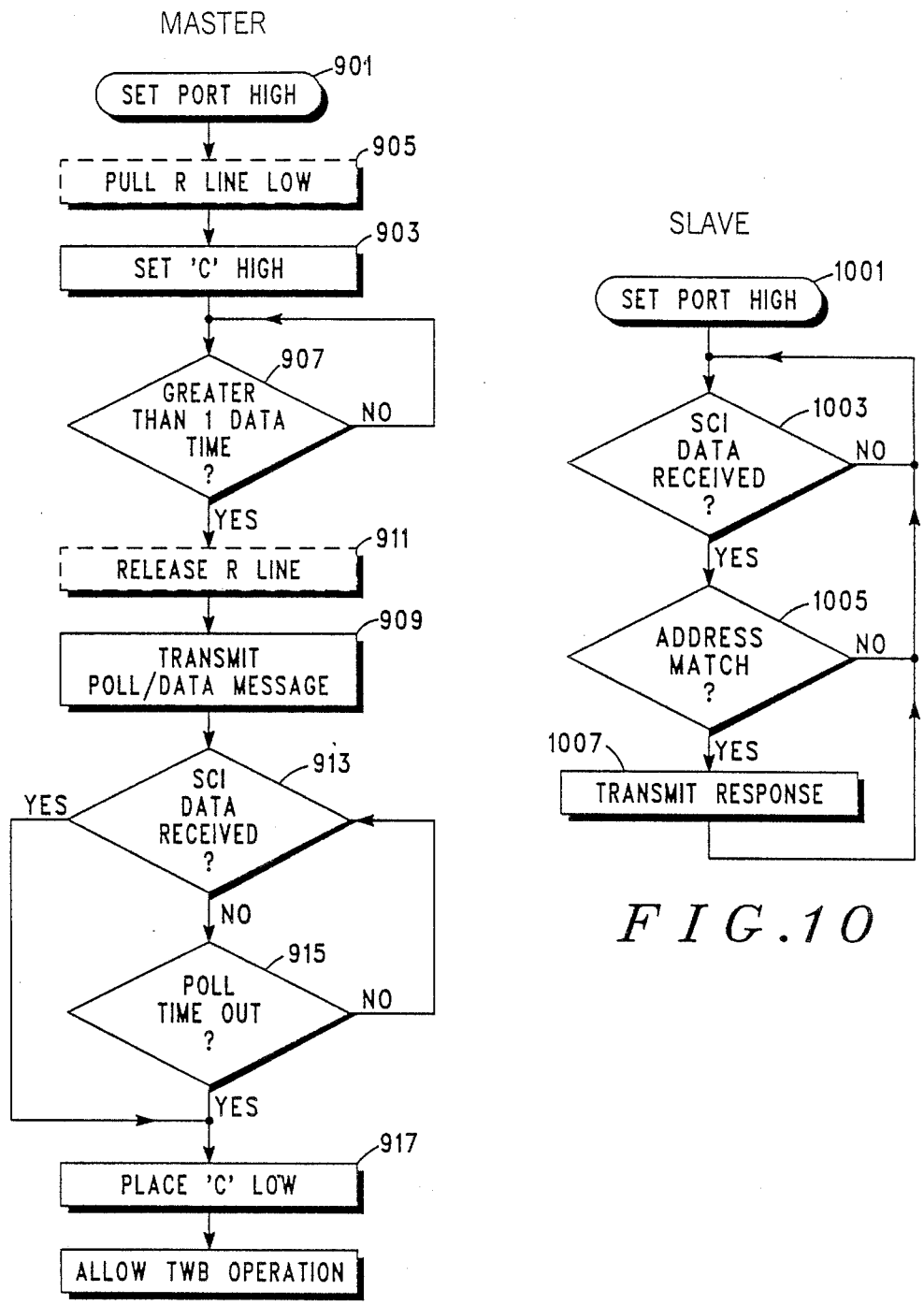

MULTIPLEXED SYNCHRONOUS/ASYNCHRONOUS DATA BUS

BACKGROUND OF THE INVENTION

The present invention relates generally to data transmission systems and more particularly to a synchronous self-clocking digital data transmission system having a layered asynchronous serial digital data transmission system for increasing the rate of data transfer.

A synchronous self-clocking digital data transmission system has been described in U.S. Pat. No. 4,369,516 to Byrns. This system provides a synchronous, self-clocking, bidirectional data transmission bus which is immune to speed and timing variations and suited for data bus structures of long length. The use by a data transmitter of two bit binary states of two data signal lines enables the unique definition of the beginning and end of a data signal and the binary states of the bits of a data signal while also differentiating between addresses and data signals. A third data signal line is used by peripheral devices to return communications to the data transmitter. As implemented in some mobile and portable radiotelephone equipment currently available for cellular radiotelephone systems, the synchronous self-clocking data bus is operated at relatively low data rates. The inherent capabilities of the bus and its data rate allow operation in areas of high electrical noise (e.g. an automobile) and produces little electromagnetic interference itself.

Asynchronous serial data transmission systems are well known in the art and offer high rates of data transfer. For example, the MC68HC11A8 microprocessor utilizes a serial communications interface (SCI) whereby the microprocessor may communicate with peripheral devices using a standard NRZ (mark/space) format on both a receive data input port (RXD) and a transmit data output port (TXD). The MC68HC11A8 serial communications interface is further described in the HMOS Single Chip Microcomputer Data Book, order number ADI1207R1, 1987, pp. 5-1 to 5-5.

In order to realize the features of both types of data transmission systems in the subscriber equipment of cellular radiotelephone systems, it would be necessary to incorporate both on a common physical bus structure in order to reduce the number of lines and connectors. The size of the physical bus is particularly important in portable radiotelephone equipment. It is also desirable that the self-clocking synchronous bus in current use continue in use unmodified without retrofitting equipment already in service. This desire is in conflict with the increasing necessity of exchanging data at higher transmission rates.

It would be desirable therefore, to combine the immunity to speed variations, timing variations, and long physical bus length of the present low data transfer rate synchronous data bus with the increased data transfer rate of the asynchronous data bus. Since in many applications the number of bus lines and corresponding connectors is an important consideration, it would also be desirable to maintain the number of signal lines in a combined bus structure.

SUMMARY OF THE INVENTION

Thus, one object of the present invention is to advantageously combine a self-clocking synchronous data bus and a serial asynchronous data bus.

Another object of the present invention is to accomplish such a combination of a synchronous and an asynchronous data bus without an increase in the number of data signal lines.

Another object of the present invention is to combine the synchronous and asynchronous data busses such that compatibility is maintained with earlier uses of the synchronous bus.

BRIEF DESCRIPTION OF THE DRAWINGS

FIG. 8 is a schematic diagram of the R line interfaces of FIG. 7.

FIG. 9 is a flowchart of the process of multiplexing asynchronous data with the synchronous data as employed in the present invention.

FIG. 10 is a flowchart of the response of a slave unit to the transmission of asynchronous data shown in the flowchart of FIG. 9.

FIG. 11 is a timing diagram of the multiplexed synchronous and asynchronous data appearing on the T, C, and R lines of the bus and further illustrating the transfer of "master" status from the converter peripheral to the portable radiotelephone.

FIG. 12 is a diagram of the asynchronous data packet structure as employed in the present invention.

DETAILED DESCRIPTION OF THE PREFERRED EMBODIMENT

One application which may advantageously employ the present invention is that of a portable radiotelephone in which a minimum number of data bus lines and associated connectors aids in the miniaturization of the radiotelephone equipment. Although the invention is described with portable radiotelephones as the preferred embodiment, the invention may just as well be employed in other applciations having similar requirements or requirements necessitating interconnection with equipment employing the present invention.

Radiotelephones provide the same type of fully automatic telephone service to a mobile or portable user that is provided to a conventional land line subscriber. In a cellular radiotelephone system, service is provided over a wide geographic area by dividing the area into a number of cells. Each cell typically has a base station which provides a signalling radio channel and a number of voice radio channels. Telephone calls are placed to, and originated by, radiotelephones over the signalling channel in each of the cells. Upon completion of the signalling, the radiotelephone is assigned a voice channel to which it switches form the signalling channel for the duration of the call. In the event that a radiotelephone leaves the cell and enters another cell, the radiotelephone is automatically switched over, or handed off, to an available voice channel in the new cell.

The present invention has been designed to operate in the portable radiotelephone units of a cellular system, although it could be used in any automatic radiotelephone system. The portable unit may be one such as that marketed by Motorola, Inc. as sales model.F09FGD8453AA or generally of the type described in U.S. Pat. No. 3,906,166 "Radio Telephone System" by Cooper et al. and U.S. Pat. No. 3,962,553 "Portable Telephone System Having a Battery Saver Feature" by Linder et al.

Figure 1:
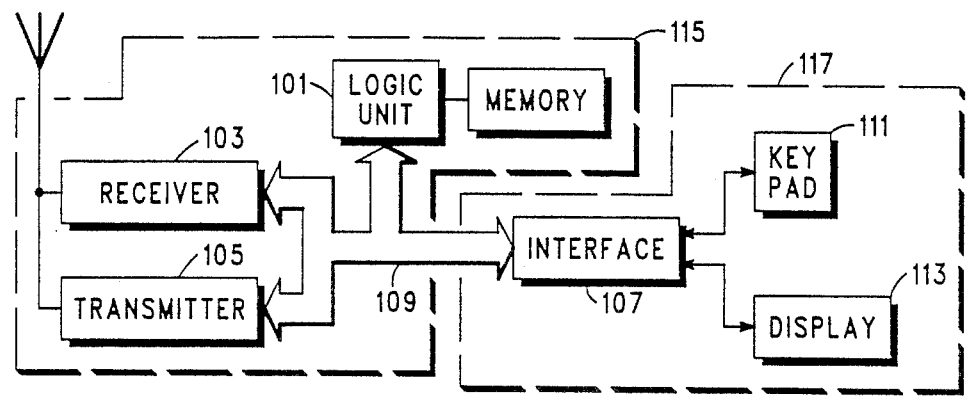
FIG. 1 is a block diagram of a portable radiotelephone which may employ the present invention.

In order to accommodate the signalling and control functions in an automatic radiotelephone system, a microprocessor, memory, and related peripheral devices are employed in a logic unit for control of the portable radiotelephone. This logic unit may be architectured such that the signalling received from the base station or transmitted to the based station is handled on a high speed interrupt basis while control signals for the radio unit, including keypad and display, are handled on a lower speed basis by way of a separate serial data bus. Such a microprocessor control system is further described in U.S. Pat. No. 4,434,461 "Microprocessor with Duplicate Registers for Processing Interrupts" by Puhl. Alternately, all data communication between the logic unit, the portable transceiver and the integral keypad and display may be handled on a high speed serial data bus as shown in FIG. 1. In FIG. 1, a conventional logic unit 101 is connected to the receiver 103 and the transmitter 105 and in interface 107 via a self-clocking serial data bus 109. The receiver 103, transmitter 105, and logic unit 101 with its associated memory may be physically grouped together as a radio unit 115. The interface 107 and telephone keypad 111 and user character display 113 may be a separate control unit 117 (as in a mobile radiotelephone configuration) or it may be fully integrated into one package (as in a portable radiotelephone). The self-clocking nature of the serial data bus 109 enables the interface adaptor 107 to be remotely located from the logic unit 101.

Figure 2:
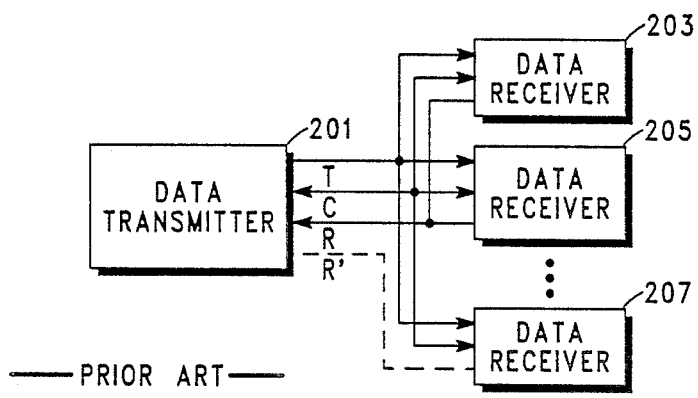
FIG. 2 is a block diagram of a known generalized data communication system which may be useful in employing the present invention.

The serial data bus may be briefly described in conjunction with FIG. 2. A more detailed description of this data bus is found in U.S. Pat. No. 4,369,516, by Byrns. A general data transmitter 201 is coupled to data receivers 203, 205, and 207 by two signal lines, labeled T (true data) and C (compliment data). The data receivers 203 and 205 may also transmit return data signals to the data transmitter by means of a shared signal line labeled R (return data). A separate return data line (R') may also be used to transmit return data signals to the data transmitter as shown for data receiver 207. The return data signals transmitted by the data receivers 203, 205, and 207 on the return data signal lines are transmitted in synchronism with the data signals received from the data transmitter 201 on the true data and complement data signal lines.

If the general bidirectional bus concept of FIG. 2 is applied to the control circuitry of a portable radiotelephone, the data transmitter becomes the logic unit and the data receivers become the transmitter, receiver, user interface, and other devices sharing the bus.

Figure 3:
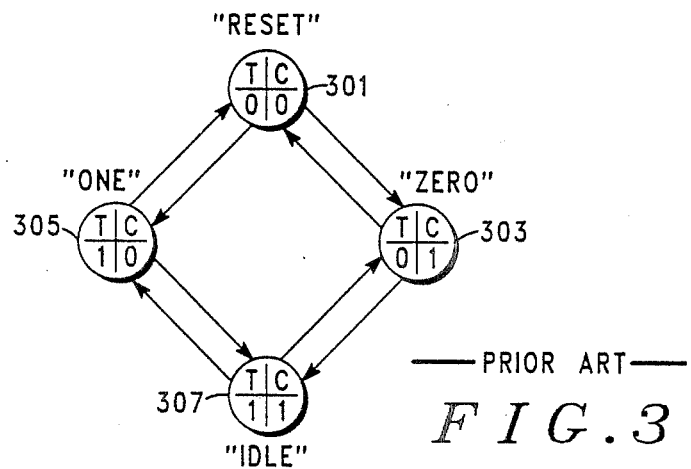
FIG. 3 is a state diagram for a known method of communicating data on the system of FIG. 2.

The format taken by the data transmitted by the data transmitter 201 to the data receivers 203, 205, and 207 makes use of the four two-bit binary states which can be assumed by the true data and complement data signal lines taken together. For example, referring to the state diagram of FIG. 3, a first two-bit binary state may be referred to as a "reset" state 301, where the true data signal line has a binary zero value and the complement date signal line also has a binary zero value. When no data is being transmitted, the reset state 301 is provided on the true data and complement data signal lines. When a data signal is to be transmitted, a transition is made form the reset state 301 to either a "zero" state 303 or a "one" state 305 corresponding to a zero or a one in the input data to be transmitted. In the zero state 303, the true data line assumes a zero binary value and the complement data line assumes a one binary value and the complement data line assumes a binary zero value. Following the one state 305 or the zero state 303, the serial data bus assumes an "idle" state 307 in which both the true data line and the complement data line assume a one binary value. A transition is then made from the idle state 307 to either the one state 305 or the zero state 303. For all succeeding bits of the data signal to be transmitted, a transition is made to the idle state 307 before a transition to the one state 305 or the zero state 303. This can be seen in FIG. 4.

Figure 4:
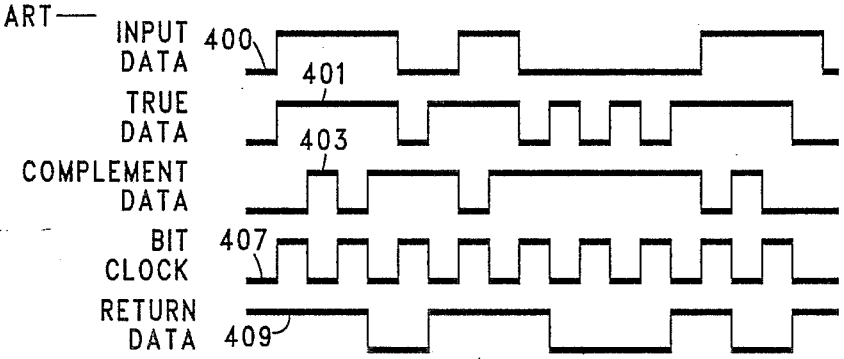
FIG. 4 is a timing diagram showing the relationship between the input data and the data transmitted over the system of FIG. 2.

Transitions between the states in FIG. 4 are selected such that only one signal line is changing binary value during each transition. Transitions between the reset state 301 and the idle state 307 and between the one state 305 and the zero state 303 are not allowed since they would require that the value of both the true and the complement data signal lines change simultaneously. This limiting of transitions between the binary states minimizes the effects of skewing and timing variations. Moreover, by transmitting data signals as illustrated in the state diagram of FIG. 3, the transmission on the true data and complement data signal lines is both self-clocking and independent of the transmitting frequency. The time duration between each of the state transitions need not be the same and may vary dynamically thereby enabling the frequency of the data transmission to be entirely asynchronous with randomly varying time intervals between successive state transitions.

Understanding of the synchronous data format may be enhanced by referring to FIG. 4. For transmission of a data signal, two state transitions occur for each input data bit shown in input data stream 400. For the first bit of the transmitted data signal, a transition is made from the reset state 301 to the one state 305 resulting in the true data signal line attaining a binary one as shown at 401. Next, a state transition is made to the idle state 307 resulting in the complement data signal line attaining a binary one value at 403. Then, for each succeeding bit of the data signal, a transition is made the one state 305 or the zero state 303 and then back to the idle state 307 for each bit of the data input signal to be transmitted, the received idle state 307 can be utilized at the data receivers to generate a bit clock signal 407. For the last bit of the data signal, the last state transition is made from the one state 305 or the zero state 303 to the reset state 301. Returning to the reset state 301 after the last bit of the data signal has been transmitted indicates to the data receivers 203, 205, and 207 that a complete data signal has been transmitted.

Figure 5:
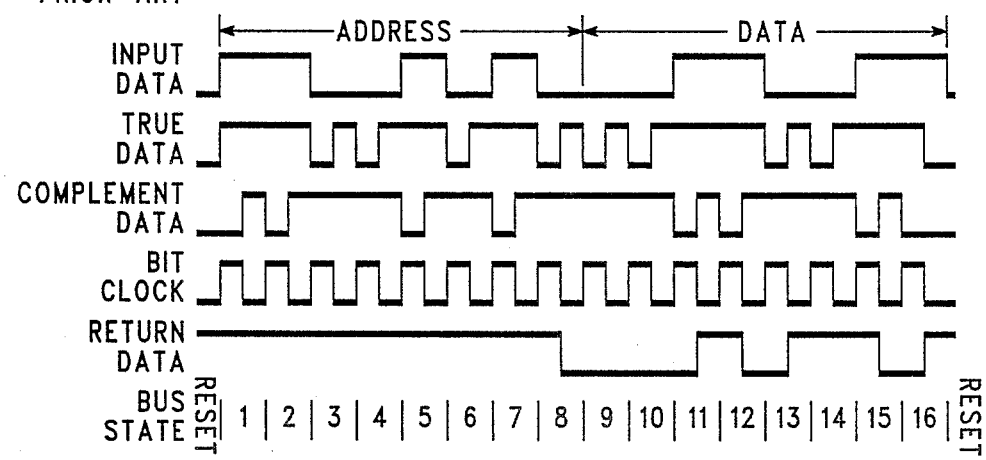
FIG. 5 is a timing diagram showing information and addressing data which may be transmitted over the system of FIG. 2 and may be used to select a particular data receiver for the information.

In order to provide for the bidirectional transmission of data signals between the data transmitter 201 and the data receivers 203, 205, and 207, another signal line referred to as the return data signal line 409 is provided for carrying data signals from the data receivers 203, 205, and 207. The data receivers can transmit a return data signal on the return data signal line by utilizing the bit clock signal 407 developed by detecting the bit value of the true data and complement data signal lines. As previously described, separate return data signal lines can be provided to each data receiver as for data receiver 207, or a number of data receivers such as data receivers 203 and 205 can be connected to one return data signal line. If a number of data receivers are connected to the same return data signal line, it becomes necessary to selectively address the particular data receiver that is to transmit a return data signal. Many different addressing schemes may be utilized and one such addressing scheme, which utilizes a portion of the data signal transmitted by the data transmitter to provide an address, is shown in FIG. 5. The number of bits dedicated to the address function determines the maximum number of data receivers which can be uniquely addressed. It has been shown in U.S. Pat. No. 4,390,963, "Interface Adaptor Architecture" by Puhl, et al. that the true data and complement date signal lines may be dynamically interchanged and an additional number of unique addresses may be obtained.

A serial asynchronous bus which may be utilized in the present invention is that which may be employed as the Serial Communication Interface (SCI) for the MC68HC11 family of 8-bit microprocessors (or their equivalents). Such an asynchronous bus is characterized by a standard NRZ format (one start bit, eight or nine data bits, and one stop bit) and meets the following criteria:

(1) The idle line is brought to a logic one state prior to transmission/reception of a character.

(2) A start bit (logic zero) is used to indicate the start of a frame.

(3) The data is transmitted and received least-significant-bit first.

(4) A stop bit (logic one) is used to indicate the end of a frame. A frame consists of a start bit, a character of eight or nine data bits, and a stop bit.

(5) A break is defined as the transmission or reception of a low (logic zero) for at least one complete frame time.

Figure 6:
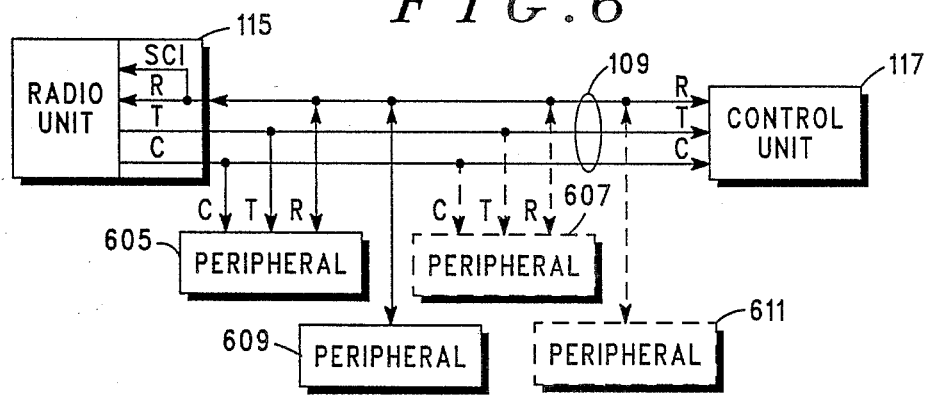
FIG. 6 is a simplified block diagram of a radiotelephone remote unit having a three wire bus structure with multiplexing capability.

It is an important feature of the present invention that the faster single line asynchronous SCI bus is layered over the top of the synchronous bus. This enables backwards compatibility with equipment which may utilize only the synchronous bus while increasing the rate of data transfer. In a portable radiotelephone with integral radio unit and control unit (generically called a remote unit), the T (true data) and C (complement data) lines are unidirectional lines that go between the logic unit 101 of the radio unit 115 and the interface of the control unit 117 and from the radio unit 115 to external or other internal peripherals. The third line is the bidirectional R (return) line, it is used by the control unit 117 and peripherals to talk to the radio unit 115 logic unit 101 as well as other devices on the bus. Data is passed down the bus, with T and C setting up the timing. It is a synchronous bus. In the preferred embodiment, a high speed asynchronous bidirectional bus is multiplexed on the R line of the synchronous self-clocking data bus (called herein a three-wire bus, or TWB). The high speed asynchronous bus (SCI-Serial Communication Interface) runs at over 10 times the speed of the TWB (conventionally 300 bps) and, through software control, can share the same data line. The SCI employed in the present invention is a single line bidirectional bus. All devices that communicate on this bus write to the same line as well as receive data from it. FIG. 6 shows the configuration of the two multiplexed buses.

As shown, the TWB of T, C, and R lines are coupled from the radio unit 115 to the control unit 117. In a portable radiotelephone remote unit the radio unit 115 and the control unit 117 are physically located in the same housing. Peripheral 605 which is also coupled to the T, C, and R lines can receive data from the TWB as well as send data to other peripherals 607 (if any), as well as the radio unit 115 and the control unit 117. Such peripherals may be scramblers, data devices, or additional handsets and may be internal or external to the portable radiotelephone remote unit. Another example of a peripheral is described in U.S. Pat. No. 4,680,787 "Portable Radiotelephone Vehicular Converter and Remote Handset" to Marry, which is a vehicle-mounted converter which can provide external power, an external antenna, radio-frequency (RF) amplification for the receiver and transmitter of a portable remote unit, and other features which may not be available on the portable radiotelephone.

When the portable radiotelephone is placed in the converter, it is desirable that an automatic integration of all logic functions occur. Initially, the portable radiotelephone logic unit 101 must verify that it has been connected to the converter peripheral 605. Once this is accomplished, functions which originally were part of the portable radiotelephone may be transferred to the converter peripheral 605. This transfer of functions conventionally has been a data exchange on the TWB. However, in some instances the transfer may require too much time to complete. For example, in virtually every cellular radiotelephone system, each individual remote unit, portable or mobile, has one or more unique associated information sets, one of which includes NAM data (e.g., phone number, system ID, system channel scan data and serial number). The phone number in the NAM data is used by the cellular radiotelephone systems to identify the remote unit using the system. Since it is useful for the system user to have a portable radiotelephone and a vehicle mounted converter peripheral, it is economically advantageous to have the converter peripheral contain most, if not all, of the functions of a mobile radiotelephone and be endowed with the capability of assuming the identity of the portable radiotelephone as defined in the aforementioned NAM data. A process of transferring identity is described in U.S. patent application No. 107,227 "Radio Arrangement Having Two Radios Sharing Circuitry" filed on Oct. 9, 1987 in behalf of Metroka. NAM data transfer communication between the converter peripheral and the portable radiotelephone includes data transfer between microprocessors resident in the converter peripheral and the portable radiotelephone logic unit 101.

The portable radiotelephone must download its NAM, serial number and telephone number repertory memory into the converter peripheral in order for the system to work without annoying delays to the user. When the TWB is used, a delay is encountered due to the slow rate of data transfer of the TWB. Further, the use of the TWB alone limits the versatility of the portable converter system because the converter peripheral, in order to keep user-feature continuity between the operation of the portable radiotelephone alone and the operation of the radiotelephone when the portable is plugged into the converter, must have software that has the same user features as the portable. As the portable's functions change in response to market requirements, the converter peripheral functions must also be updated. The higher speed asynchronous data bus allows the necessary data transfer.

The present invention multiplexes the single-line asynchronous serial bus with the R line of the TWB. Both the TWB and the SCI devices can share the same bus lines without conflict. The equipment remains backwards compatible, while still increasing the effective data transfer rate of the bus.

The interconnection of a high speed peripheral interconnection with the multiplexed synchronous/asynchronous data bus of the present invention is illustrated by the connection of peripheral 609 to the R line of the TWB. The multiplexed data bus may accommodate a plurality of peripherals (607, 611). It is also likely that a peripheral will have the capability of accessing both the parallel TWB and the high speed serial bus. The converter peripheral of the preferred embodiment is such a peripheral.

Figure 7:
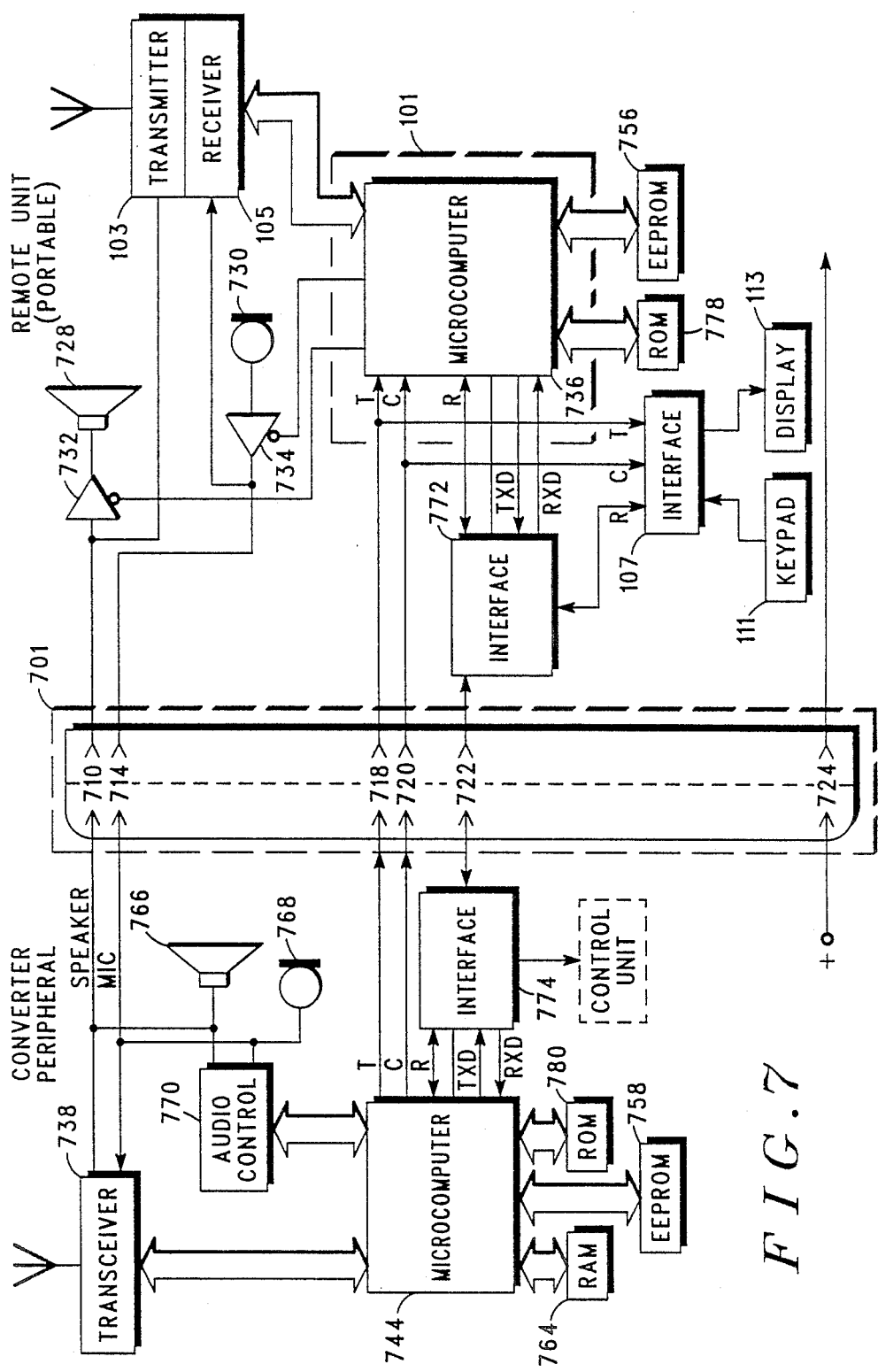
FIG. 7 is a block diagram of a portable radiotelephone remote unit and a converter peripheral which may employ the present invention.

Referring now to FIG. 7, a remote unit is shown in detail coupled to a converter peripheral. As described previously, a portable radiotelephone user may insert a portable radiotelephone into a vehicular-mounted converter for external power, external antenna, RF amplification, and other features. A connector interface 701 is illustrated in FIG. 7 which connects audio connections 710 and 714, TWB lines 718, 720, and 722, and power connection 724. Other connections, of course, may be made as necessary.

Connections 710 and 714 are audio connections which allow the portable to act as a handset, while the portable and converter are intercoupled. A speaker 728 and a microphone 730, conventional in portables, are coupled to the audio connections 710 and 714 through mute gates 732 and 734 to provide this function. The mute gates may be controlled by microcomputers 736 and 107 as is conventionally provided in stand alone portables or mobiles. See, for example, Motorola Instruction Manual Nos. 68P81070E40 and 68P81046E60, entitled "DYNA TAC Cellular Mobile Telephone Instruction Manual" and "DYNA TAC Cellular Portable Telephone Instruction Manual" respectively. Both manuals are available from Motorola C & E Parts, 1313 Algonquin Road, Schaumburg, IL, 60196, U.S.A. Microcomputers 736 and 744 may be conventional microprocessors such as MC68HC11A8 or equivalent devices.

The converter peripheral of the preferred embodiment may contain a complete radio transceiver 738, as described in aforementioned U.S. patent application No. 107,227, in which case the portable radiotelephone transmitter 103 and receiver 105 are deactivated during the time the portable is coupled to the converter peripheral. The converter peripheral, in effect, takes on the identity of the portable radiotelephone during the period of coupling and is operated by the user as though it were a conventional mobile radiotelephone.

Upon the portable radiotelephone being plugged into the converter peripheral, an exchange of data occurs on the multiplexed synchronous/asynchronous data bus of the present invention whereby the NAM information stored in the portable memory EEPROM 756 is downloaded via microcomputer 744 into RAM 364. Such a data transfer allows the converter peripheral to assume the portable's identity for subsequent communication on the cellular system. Additional portable functions, such as repertory dialing telephone numbers, may also be downloaded into converter peripheral memory EEPROM 758. Likewise, control of audio transducers 766 and 768 may be relinquished to microcomputer 744 and audio control 770.

The amount of data to be exchanged is, therefore, a sizable amount and would require a relatively long time to transfer at the 300 bps rate of the conventional TWB. The multiplexing of the present invention allows a much higher rate of data transfer by placing the TWB in an in-use state (thereby preventing the interface 107 of the portable radiotelephone, for example, from accessing and applying data to the TWB) and transferring the identifying data from the portable radiotelephone on the serial data bus of the R line. An interface 772 is resident in the portable radiotelephone and an interface 774 is resident in the converter peripheral.

A more detailed schematic of interfaces 772 and 774 is shown in FIG. 8. TXD input 801 and RXD output 803 are coupled, respectively, to the appropriate ports of microcomputer 736 (not shown in FIG. 8). Separation between ports TXD 801 and RXD 803 may be realized by transistor 805 under control of one input 807 connected to the microcomputer 736 (but is not used in the preferred embodiment). Likewise TXD input 809 and RXD output 811 and control port 813 of interface 774 are coupled to the converter peripheral microcomputer 744. The R line is coupled from microcomputer 736 to input 813 of interface 772, through coupling network 815, and output via output 817. The R line from control unit interface 107 is coupled via port 819 and transistor 821 to the coupling network 815. A similar arrangement is made for interface 774.

The method exercised by microcomputer 736 (as stored in memory ROM 778) to control the multiplexed synchronous/asynchronous data bus of the present invention is shown in the flow chart of FIG. 9. Under most operating conditions, the TWB mode is in operation and data is exchanged as described previously on the T, C, and R lines. When an exchange of a substantial amount of data must occur, such as when a portable radiotelephone remote unit is placed in a converter, the portable detects a change in power source and processes an initial power-up sequence. The converter peripheral is considered the master unit at this time and, in addition to messages normally sent on the TWB, sends high speed polling messages on the R line in accordance with the present invention. Such messages are sent by first setting the input port 823 of interface 774 to a logic high (at 901) in order to couple the TXD and the RXD line of the microcomputer 744 together. Control of the TWB is obtained by placing a logic high on the C line (at 903). A logic low may optionally be placed on the R line (at 905). The process then waits (at 907) for a period of time greater than one normal TWB data bit before commencing the transmission of a polling message or a data message (at 909). If the R line were pulled low at 905, a release of the optional low placed on the R line will occur at 911, preceding the poll or data transmission. The process then awaits a poll response (at 913 and 915) and places the C line at a logic low (at 917) following either receipt of the poll response (or a data message) or a time out of a predetermined poll time. The placement of the logic low on the C line returns the bus to normal TWB operation.

The response of the portable radiotelephone to high speed data upon the return of power after the portable is plugged into the converter is shown in FIG. 10. At this point in time, the portable is considered the slave unit. The portable sets the input port 807 to a logic high (at 1001) and awaits high speed data (at 1003) which is coupled to microcomputer 736 via the RXD line. Upon detection of an address match (at 1005) the microcomputer 736 composes and transmits a data message response (at 1007) on the TXD line.

A timing diagram of the activity on the TWB during the process previously described is shown in FIG. 11. Normal TWB operation occurs during the time designated "A". (Both the portable radiotelephone and the converter peripheral have independent TWBs prior to the coupling of the portable and the peripheral. The activity during "A" could be either TWB). Assuming the portable radiotelephone and the converter are plugged together at time "t", the portable processes a power-up sequence after "t" (not shown). The TWB activity and any high speed data exchange is dominated by the converter peripheral and the converter peripheral is the "master" for the high speed serial data bus. The C line is forced high (at 1101) by the converter microcomputer 744 in order to poll devices on the high speed serial data line (which is the multiplexed R line. In this example, the R line is not forced low). After one TWB standard data bit time 1103, the converter peripheral transmits a poll message 1105 on the R line. The portable radiotelephone responds with a poll response at 1107 which in the preferred embodiment, includes the portable NAM data and identification. The converter peripheral microcomputer 744 causes the C line to go low (at 1109) and subsequently forces the C line high (at 1111) in order to transmit another message to the portable.

In the preferred embodiment of the present invention, master status and control is passed to the portable radiotelephone at this point if the converter peripheral does not have an auxiliary control unit or telephone handset coupled to it. If the converter peripheral does have such a control unit or handset, the converter retains master status and the control unit of the portable radiotelephone is deactivated as described in aforementioned U.S. Pat. No. 4,680,787.

If the converter peripheral does not include a control unit or handset, a high speed message transferring control to the portable is transmitted to the portable at 1113. The portable, in response to the high speed data message of 1113, confirms and transmits a control message at 1115. The converter microcomputer 744 subsequently releases the C line at 1117. All further control is assumed by the portable radiotelephone microcomputer 736 which activates and deactivates the serial high speed data bus via interface 772. The portable radiotelephone is the master and initiates subsequent polling of any high speed peripherals (including the converter peripheral) at periodic intervals. Any such peripherals may respond to the polling when their address is part of the polling message. The release of C line at 1117 returns the TWB to normal operation.

A diagram of the high speed data message format is illustrated in FIG. 12. A preamble 1201 has a four bit value in the least significant nibble 1203 of the first transmitted byte to provide a synchronization pattern with all devices on the SCI high speed data bus. Additional fields identify the response desired from the addressed unit (1205) and other overhead functions. The count field 1207 provides a count of the total number of data bytes to be transmitted in the packet. The address field 1209 identifies the logical device source 1211 and destination 1213 address fields thus enabling the selective communication with individual devices on the bus. The control field 1215 is used to indicate the defined action or the proper interpretation of the following data field(s). The data field(s) comprise any required data and may be of variable length to include the required data. The checksum field 1217 contains a value that causes a simple sum of all transmitted bytes to equal zero as a method of detecting errors on the bus.

In summary, then, a multiplexed synchronous/asynchronous data bus has been shown and described. This multiplexed data bus utilizes a synchronous self-clocking three line bus for reliable transfer of data at a relatively low data throughput rate. In order to transfer data at a significantly higher data rate, one of the three bus lines is used to carry relatively high speed asynchronous serial data messages. To prevent interaction between the low and high rate data, the low speed synchronous data bus is placed in an in-use busy state during the transmission of the asynchronous serial data. Such a multiplexed synchronous/asynchronous data bus is particularly useful for a portable radiotelephone which may be coupled to a vehicle mounted converter supplying power, antenna, radio frequency amplification, and other features to the portable radiotelephone. It is advantageous for the portable radiotelephone to transfer its identification and other operational characteristics to the converter unit at a rapid data rate.

We claim:

1. A master data device employing a data transmission bus including three communications lines for transmitting a first data message from the master data device to a second data device at a first rate of data transfer and for transmitting a second data message from the master data device to the second data device at a second rate of data transfer, each of the two data messages having a plurality of binary bits each bit having either a binary zero state or a binary one state for a period of time which is related to the data transfer rate, the master data device comprising:
   means for applying a first binary state to a first and a second of the three communications lines before and after said first data message;
   means for coupling the first data message to said first and second of the three communications lines;
   means for applying a second binary state to said first of the three communications lines when the first data message is not being transmitted; and
   means for applying the binary bits of the second data message to said third of the three communications lines while said second binary state is applied to said first of the three communications lines.

2. A master data device in accordance with claim 1 wherein said means for applying said second binary state further comprises means for delaying said application of binary bits of the second data message for a period of time greater than one bit time of the first rate of data transfer.

3. A master data device in accordance with claim 1 wherein said means for coupling the first data message further comprises means for applying, for each bit of the first data message, a second binary state to said first of the three communications lines and said first binary state to said second of the three communications lines during at least part of the time a first data message bit has a binary zero state, and applying said first binary state to said first of the three communications lines and said second binary state to said second of the three communications lines during at least part of the time a first data message bit has a binary one state.

4. A master data device in accordance with claim 3 wherein said means for applying, for each bit of the first data message, a second binary state further comprises means for applying said second binary state to the first and second of the three communications lines between successive bits of the first data message.

5. A master data device in accordance with claim 1 further comprising means, responsive to said second data message, for receiving from the second data device on said third of the three communications lines a third data message at the second rate of data transfer while said second binary state is applied to said first of the three communications lines.

6. A master data device in accordance with claim 5 further comprising means for applying said first binary state to said first of the three communications lines following receipt of said third data message.

7. A master data device in accordance with claim 6 further comprising means, responsive to said third data message reception, for reapplying said second binary state to said first of the three communications lines and means, responsive to said reapplying, for applying the binary bits of a fourth data message to said third of the three communications lines while said second binary state is reapplied to said first of the three communications lines.

8. A master data device in accordance with claim 7 further comprising means, responsive to said fourth data message, for receiving from the second data device on said third of the three communications lines, a fifth data message at the second rate of data transfer while said second binary state is reapplied to said first of the three communications lines.

9. A master data device in accordance with claim 8 further comprising means for reapplying said first binary state to said first of the three communications lines following receipt of said third data message.

10. A slave data device employing a data transmission bus including three communications lines for receiving a first data message transmitted from a master data device at a first rate of data transfer, for receiving a second data message transmitted from the master data device at a second rate of data transfer, and for communicating a third data message to the master data device, each of the three data messages having a plurality of binary bits, each bit having either a binary zero state or a binary one state for a period of time which is related to the data transfer rate, the slave data device comprising:

means for receiving a first binary state from first and second of the three communications lines before and after said first data message;
means for receiving the first data message from said first and second of the three communications lines;
means for coupling at the first rate of data transfer the binary bits of the third data message to a third of the three communications lines;
means for receiving a second binary state applied to said first of the three communications lines by the master data device for a period of time greater than one bit time of the first rate of data transfer when the first and second data messages are not being received; and means for receiving the binary bits of the second data message from said third of the three communications lines while said second binary state is received from said first of the three communications lines.

11. A slave data device in accordance with claim 10 further comprising means, responsive to the second data message, for applying the binary bits of a fourth data message to said third of the three communications lines while said second binary state is received from said first of the three communications lines.

12. A data transmission system including three communications lines for communicating a first data message from a first data device to a second data device at a first rate of data transfer, for communicating a second data message from the first data device to the second data device at a second rate of data transfer, and for communicating a third data message from the second data device to the first data device, each of the three data messages having a plurality of binary bits, each bit having either a binary zero state or a binary one state for a period of time which is related to the data transfer rate, the system comprising:

means at the first data device for applying a first binary state to a first and a second of the three communications lines before and after said first data message;
means at the first data device for coupling the first data message to said first and said second of the three communications lines;
means at the second data device for coupling the binary bits of the third data message to a third of the three communications lines;
means at the first data device for applying a second binary state to said first of the three communications lines when the first and third data messages are not being communicated; and
means for applying the binary bits of the second data message to said third of the three communications lines while said second binary state is applied to said first of the three communications lines.

13. A data transmission system in accordance with claim 12 wherein said means at the first data device for coupling further comprises means at the first data device for applying, for each bit of the first data message, a second binary state to said first of the three communications lines and said first binary state to said second of the three communications lines during at least part of the time a first data message bit has a binary zero state, and applying said first binary state to said first of the three communications lines and said second binary state to said second of the three communications lines during at least part of the time a first data message bit has a binary one state.

14. A data transmission system in accordance with claim 13 wherein said means for applying, for each bit of the first data message, a second binary state further comprises means, at the first data device, for applying said second binary state to said first and second of the three communications lines between successive bits of the data signal.

15. A data transmission system in accordance with claim 12 further comprising means, at the first data device and responsive to said second data message, for receiving from the second data device on said third of the three communications lines a third data message at the second rate of data transfer while said second binary state is applied to said first of the three communications lines.

16. A data transmission system in accordance with claim 15 further comprising means, at the first data device, for applying said first binary state to said first of the three communications lines following receipt of said third data message.

17. A data transmission system in accordance with claim 16 further comprising means, at the first data device and responsive to said third data message reception, for reapplying said second binary state to said first of the three communications lines and means, responsive to said reapplying, for applying the binary bits of a fourth data message to said third of the three communications lines while said second binary state is reapplied to said first of the three communications lines.

18. A master data device in accordance with claim 17 further comprising means, at the second data device and responsive to said fourth data message, for applying the binary bits of a fifth data message to said third of the three communications lines at the second rate of data transfer while said second binary state is reapplied to said first of the three communications lines.

19. A master data device in accordance with claim 18 further comprising means at the first data device for reapplying said first binary state to said first of the three communications lines following receipt of said fifth data message.

20. A portable radiotelephone apparatus employing a data transmission bus including three communications lines for communicating a first data message to a peripheral data device at a first rate of data transfer, for communicating a second data message to the peripheral data device at a second rate of data transfer, and for receiving a third data message from the peripheral data device, each of the three data messages having a plurality of binary bits, each bit having either a binary zero state or a binary one state for a period of time which related to the data transfer rate, the apparatus comprising:
   means for applying a first binary state to a first and a second of the three communications lines before and after said first data message;
   means for coupling the first data message to said first and said second of the three communications lines;
   means for receiving the binary bits of the third data message coupled to a third of the three communications lines by the peripheral data device when the first data message and the second data message are not being communicated;
   means for applying a second binary state to said first of the three communications lines; and
   means for applying the binary bits of the second data message to said third of the three communications lines while said second binary state is applied to said first of the three communications lines.

21. A method of data transmission on a data transmission bus, which includes three communications lines for transmitting a first data message from a master data device to a second data device at a first rate of data transfer and for transmitting a second data message from the master data device to the second data device at a second rate of data transfer, each of the two data messages having a plurality of binary bits, each bit having either a binary zero state or a binary one state for a period of time related to the data transfer rate, the method comprising the steps of:
   applying a first binary state to a first and a second of the three communications lines before and after said first data message;
   coupling the first data message to said first and second of the three communications lines;
   applying a second binary state to said first of the three communications lines when the first data message is not being transmitted; and
   applying the binary bits of the second data message to said third of the three communications lines while said second binary state is applied to said first of the three communications lines.

22. A method in accordance with the method of claim 21 wherein said step of applying said second binary state further comprises the step of delaying said application of binary bits of the second data message for a period of time greater than one bit time of the first rate of data transfer.

23. A method in accordance with the method of claim 21 wherein said step of coupling the first data message further comprises the steps of applying, for each bit of the first data message, a second binary state to said first of the three communications lines and said first binary state to said second of the three communications lines during at least part of the time a first data message bit has a binary zero state, and applying said first binary state to said first of the three communications lines and said second binary state to said second of the three communications lines during at least part of the time a first data message bit has a binary one state.

24. A method in accordance with the method of claim 23 wherein said step of applying, for each bit of the first data message, a second binary state further comprises the step of applying said second binary state to the first and second of the three communications lines between successive bits of first data message.

25. A method in accordance with the method of claim 21 further comprising the step of receiving from the second data device on said third of the three communications lines a third data message at the second rate of data transfer in response to said second data message, while said second binary state is applied to said first of the three communications lines.

26. A method in accordance with the method of claim 25 further comprising the step of applying said first binary state to said first of the three communications lines following receipt of said third data message.

27. A method in accordance with the method of claim 26 further comprising the step of reapplying said second binary state to said first of the three communications lines in response to said third data message reception and the step of applying the binary bits of a fourth data message to said third of the three communications lines in response to said reapplying, while said second binary state is reapplied to said first of the three communications lines.

28. A method in accordance with the method of claim 27 further comprising the step of receiving from the second data device on said third of the three communications lines and in response to said fourth data message, a fifth data message at the second rate of data transfer while said second binary state is reapplied to said first of the three communications lines.

29. A method in accordance with the method of claim 28 further comprising the step of reapplying said first binary state to said first of three communications lines following receipt of said third data message.

* * * * *